United States Patent [19]

Shimizu

[11] Patent Number: 5,482,129
[45] Date of Patent: Jan. 9, 1996

[54] ELECTRICALLY OPERATED POWER STEERING APPARATUS

[75] Inventor: Yasuo Shimizu, Saitama, Japan

[73] Assignee: Honda Giken Kogyo Kabushiki Kaisha, Tokyo, Japan

[21] Appl. No.: 370,255

[22] Filed: Jan. 9, 1995

[30] Foreign Application Priority Data

Jan. 10, 1994 [JP] Japan ................................. 6-000936

[51] Int. Cl.$^6$ ........................................................ B62D 5/04
[52] U.S. Cl. .................................................................. 180/79.1
[58] Field of Search .................................. 180/79.1, 141, 180/142, 143, DIG. 3; 364/424.05

[56] References Cited

U.S. PATENT DOCUMENTS

| | | | |
|---|---|---|---|
| 4,538,698 | 9/1985 | Hashimoto et al. | 180/79.1 |
| 4,580,648 | 4/1986 | Murakami et al. | 180/79.1 |
| 4,809,173 | 2/1989 | Fukami et al. | 364/424.05 |
| 5,198,981 | 3/1993 | Collier-Hallman et al. | 364/424.05 |
| 5,404,960 | 4/1995 | Wada et al. | 180/79.1 |

FOREIGN PATENT DOCUMENTS 3-118173  5/1991  Japan .

*Primary Examiner*—Kevin T. Hurley
*Attorney, Agent, or Firm*—Armstrong, Westerman, Hattori, McLeland & Naughton

[57] ABSTRACT

An electrically operated power steering apparatus has a steering mechanism for steering a motor vehicle, a steering torque sensor for detecting a steering torque produced by the steering mechanism, a vehicle speed sensor for detecting a vehicle speed of the motor vehicle, an electric motor for applying an assistive steering force to the steering mechanism, and a motor current detector for detecting a motor current supplied to the electric motor. A target current to be supplied to energize the electric motor is determined based on a steering torque signal representing the steering torque detected by the steering torque sensor. A controller for controlling the electric motor has a PI control unit having a proportional element and an integral element for controlling the electric motor based on a difference between the determined target current and the motor current detected by the motor current detector, and a coefficient setting unit for varying at least one of coefficients of the proportional element and the integral element based on a vehicle speed signal representing the vehicle speed detected by the vehicle speed sensor.

4 Claims, 5 Drawing Sheets

ELECTRICALLY OPERATED POWER STEERING APPARATUS

BACKGROUND OF THE INVENTION

1. Field of the Invention

The present invention relates to an electrically operated power steering apparatus for applying the power of an electric motor as an assistive steering force to a mechanical steering system to reduce the manual force required to steer a motor vehicle which incorporates such an electrically operated power steering apparatus, and more particularly to an electrically operated power steering apparatus which produces a large assistive steering force while the motor vehicle is running at a low speed and improves the response of the assistive steering force while the motor vehicle is running at a high speed.

2. Description of the Related Art

There has been known an electrically operated power steering apparatus for establishing a target current to energize an electric motor based on a steering torque detected by a steering torque sensor and a vehicle speed detected by a vehicle speed sensor. The electrically operated power steering apparatus includes a PI (proportional plus integral) controller or a PID (proportional plus integral plus derivative) controller for compensating for a phase delay and a difference between the target current and a motor current which actually flows through the electric motor.

One conventional electrically operated power steering apparatus is disclosed in Japanese laid-open utility model publication No. 3-118173.

FIG. 3 of the accompanying drawings shows a conventional electrically operated power steering apparatus, and FIG. 4 of the accompanying drawings shows a controller of the electrically operated power steering apparatus shown in FIG. 3.

As shown in FIG. 3, the electrically operated power steering apparatus, generally denoted at 1, includes a steering wheel 2, a steering shaft 3 coupled to the steering wheel 2, hypoid gears 4, a rack and pinion mechanism 5 comprising a pinion 5a mounted on the steering shaft 3 and a rack shaft 5b having rack teeth held in mesh with the pinion 5a, a pair of tie rods 6 (one shown) coupled to respective opposite ends of the rack shaft 5b, a pair of front wheels 7 (one shown) operatively connected to the respective tie rods 6, and an electric motor 8 having a drive shaft operatively coupled to the steering shaft 3 through the hypoid gears 4. The steering wheel 2, the steering shaft 3, the rack and pinion mechanism 5, the tie rods 6, and the front wheels 7 jointly serve as a steering mechanism.

The electrically operated power steering apparatus 1 also has a steering torque sensor 10 mounted on the steering shaft 3 for detecting a steering torque applied to the steering wheel 2 and outputting an electric steering torque signal T converted from the detected steering torque, a vehicle speed sensor 11 for detecting a vehicle speed of the motor vehicle and outputting an electric vehicle speed signal V converted from the detected vehicle speed, and a controller 12 for controlling operation of the electric motor 8 based on the steering torque signal T and the vehicle speed signal V which are supplied from the steering torque sensor 10 and the vehicle speed sensor 11, respectively.

When the steering wheel 2 is manually turned by the driver of the motor vehicle, the steering torque sensor 10 detects an applied steering torque, converts the detected steering torque into a steering torque signal T, and sends the steering torque signal T to the controller 12.

Upon rotation of the steering shaft 3, the rotation of the pinion 5a is converted to axial linear motion of the rack shaft 5b by the rack and pinion mechanism 5, causing the tie rods 6 to steer the front wheels 7.

The vehicle speed sensor 11 detects a vehicle speed of the motor vehicle, converts the detected vehicle speed into a vehicle speed signal V, and sends the vehicle speed signal V to the controller 12.

Based on the steering torque signal T and the vehicle speed signal V which are supplied from the steering torque sensor 10 and the vehicle speed sensor 11, respectively, the controller 12 generates a motor current $I_M$ to energize the electric motor 8 therewith. When the motor current $I_M$ is supplied to the electric motor 8, the electric motor 8 is energized to apply an assistive steering force through the hypoid gears 4 to the steering mechanism for thereby reducing the manual steering force which is applied to the steering wheel 2 by the driver.

As shown in FIG. 4, the controller 12 includes a target current setting means 13 for converting the steering torque signal T and the vehicle speed signal V into a target current $I_{MS}$ according to Table 1 (see FIG. 6) of data representing steering torque signals T corresponding to target currents $I_{MS}$ with vehicle speed signals V used as a parameter, a subtractor 14 for calculating a difference or error $\Delta I_M$ between the target current $I_{MS}$ and the motor current $I_M$, a PI control means 15 for correcting the difference $\Delta I_M$ in a proportional plus integral control mode to produce a motor current signal $I_o$, and a motor driving means 16 for generating a motor current $I_M$ based on the motor current signal $I_o$ and supplying the generated motor current $I_M$ to energize the electric motor 8.

The PI control means 15 has a proportional element and an integral element arranged parallel to each other, and has a transfer function $F(j\omega)$ whose gain G and phase angle θ are shown in the Bode plot of FIG. 5 of the accompanying drawings.

In FIG. 5, it is known that in a range where the angular frequency ω corresponding to a steering rotational speed is low, there is a phase delay (θ=−90°), but the gain G (20logG) is greatly improved, and that in a range where the angular frequency ω is high, the gain G (20logG) is low, but the phase delay is greatly improved.

As can be seen from FIG. 5, the phase delay is − 90° in a range A of angular frequencies ω where the gain G (20logG) is large. Since the motor current $I_M$ is large if the target current $I_{MS}$ is large (V:L) while the motor vehicle is running at a low speed as indicated by Table 1 shown in FIG. 6, an actual steering assistive torque Ta produced by the electric motor 8 which is represented by the equation (1), given below, can be expressed by the equation (3), given below, because of a condition indicated by the inequality (2), given below.

$$Ta = k_T * I_M - J_M * \theta_{M''} - C_M * \theta_{M'} \pm f, \quad (1)$$

$$k_T * I_M >> J_M * \theta_{M''} + C_M * \theta_{M'} \pm f, \quad (2)$$

$$Ta \approx k_T * I_M \quad (8)$$

where $k_T$ is the torque constant of the electric motor, $J_M$ the moment of inertia of the electric motor, $C_M$ the viscosity coefficient of the electric motor, f the friction of the electric motor, $\theta_{M''}$ the steering rotational angular acceleration, and $\theta_{M'}$ the steering rotational angular velocity.

Therefore, if the target current $I_{MS}$ is large and the motor current $I_M$ is large while the while the motor vehicle is running at a low speed, then the steering feel which the driver has is not adversely affected even when the difference $\Delta I_M$ between the target current $I_{MS}$ and the motor current $I_M$ becomes a phase difference of 90°.

If target current $I_{MS}$ in Table 1 shown in FIG. 6 is small while the motor vehicle is running at a high speed, then since the motor current $I_M$ is also small, the effect of the right-hand side of the inequality (2) is so large that it cannot be ignored.

Therefore, when the current control signal $I_o$ is produced while the difference $\Delta I_M$ between the target current $I_{MS}$ and the motor current $I_M$ is equal to a phase difference of 90°, the phase difference represented by the right-hand side of the inequality (2) is added, resulting in a degradation of the steering feel.

SUMMARY OF THE INVENTION

It is therefore an object of the present invention to provide an electrically operated power steering apparatus for producing an increased assistive steering force while a motor vehicle is running at a low speed and improving the response of the assistive steering force while the motor vehicle is running at a high speed.

According to the present invention, there is provided an electrically operated power steering apparatus comprising a steering mechanism for steering a motor vehicle, a steering torque sensor for detecting a steering torque produced by the steering mechanism, a vehicle speed sensor for detecting a vehicle speed of the motor vehicle, an electric motor for applying an assistive steering force to the steering mechanism, a motor current detecting means for detecting a motor current supplied to the electric motor, target current setting means for determining a target current to be supplied to energize the electric motor based on a steering torque signal representing the steering torque detected by the steering torque sensor, and control means for controlling the electric motor, the control means comprising proportional plus integral control means having a proportional element and an integral element for controlling the electric motor based on a difference between the target current determined by the target current setting means and the motor current detected by the motor current detecting means, and coefficient setting means for varying at least one of coefficients of the proportional element and the integral element based on a vehicle speed signal representing the vehicle speed detected by the vehicle speed sensor.

The coefficient setting means comprises means for increasing the coefficient of the proportional element when the vehicle speed signal increases, and means for reducing the coefficient of the integral element when the vehicle speed signal increases.

Specifically, the coefficient setting means comprises a coefficient memory for storing coefficients of the proportional element and the integral element in relation to vehicle speeds, and a coefficient selector for selecting coefficients of the proportional element and the integral element from the coefficient memory depending on the vehicle speed signal.

With the above arrangement, the control means includes the coefficient setting means which varies the coefficients of the proportional and integral elements depending on the vehicle speed. The assistive steering force is increased while the motor vehicle is running at a low speed, and the response of the assistive steering force is increased while the motor vehicle is running at a high speed.

Specifically, as the vehicle speed increases, the coefficient setting means increases the coefficient of the proportional element or reduces the coefficient of the integral element as the vehicle speed increases.

The above and further objects, details and advantages of the present invention will become apparent from the following detailed description of a preferred embodiment thereof, when read in conjunction with the accompanying drawings.

DETAILED DESCRIPTION OF THE PREFERRED EMBODIMENT

Figure 3:
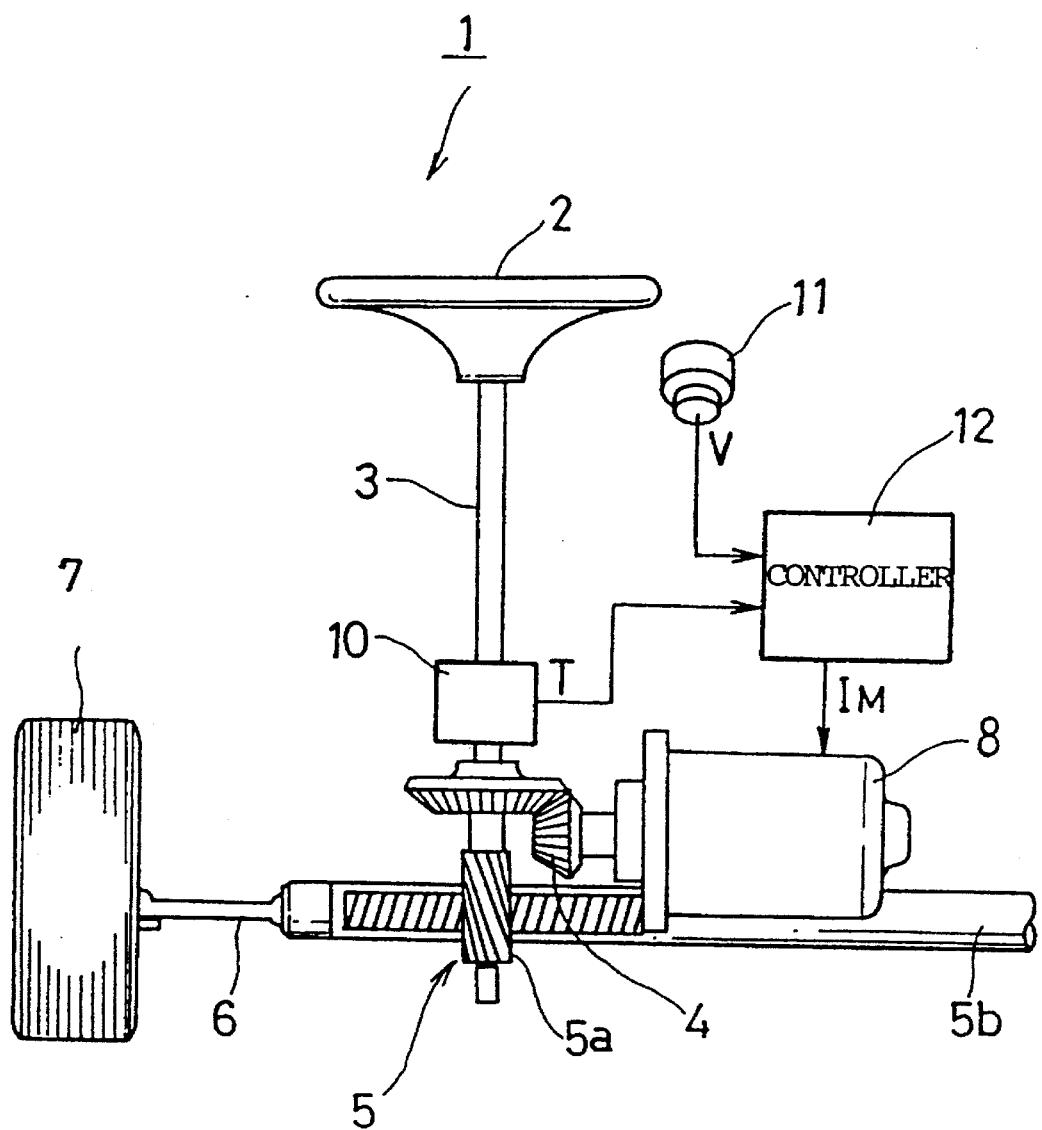
FIG. 3 is a fragmentary elevational view of a conventional electrically operated power steering apparatus.
Figure 4:
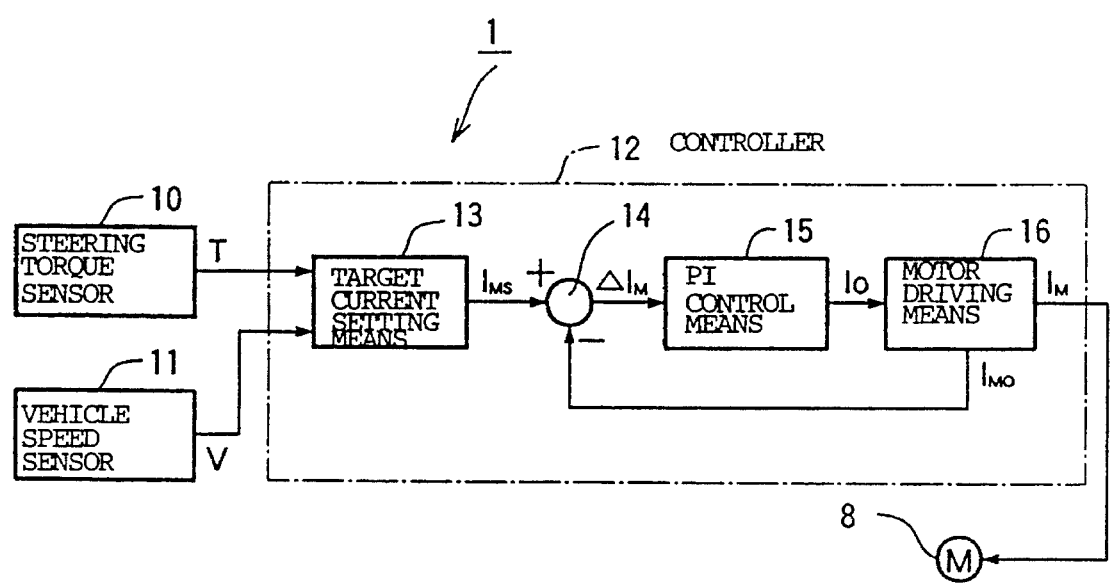
FIG. 4 is a block diagram of a controller and associated components of the conventional electrically operated power steering apparatus shown in FIG. 3.
Figure 5:
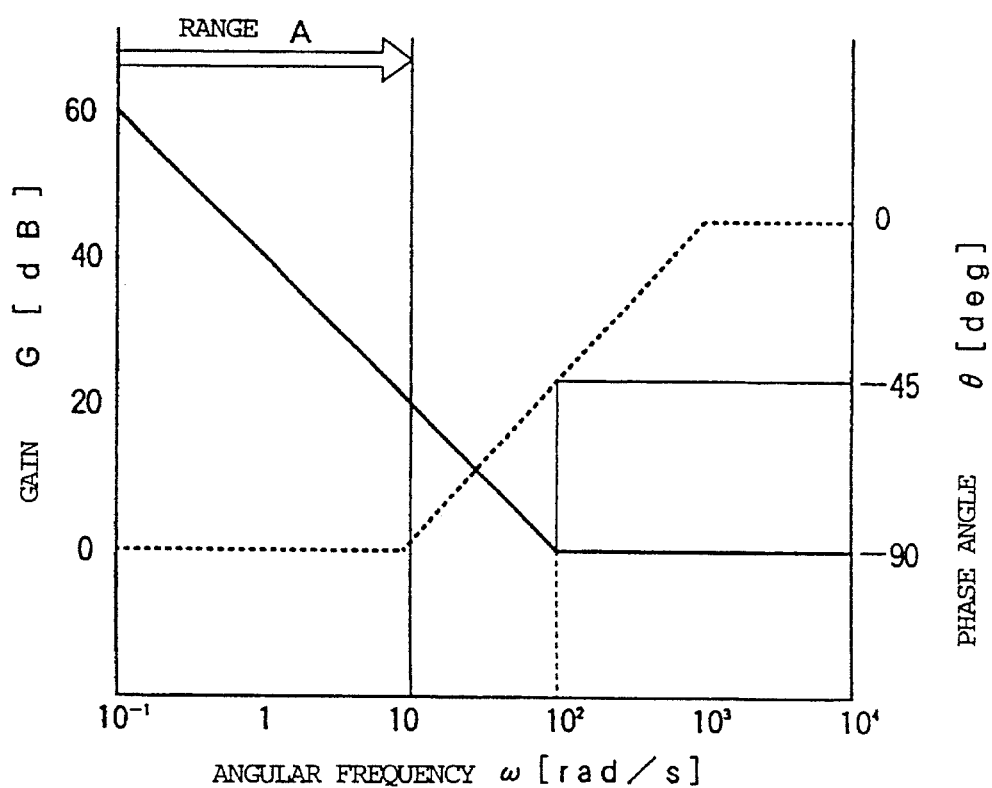
FIG. 5 is a Bode plot of a PI control means in the controller shown in FIG. 4, with vehicle speed signals V used as a parameter.

An electrically operated power steering apparatus according to the present invention has a steering mechanism identical to that of the conventional electrically operated power steering apparatus shown in FIG. 3.

Figure 1:
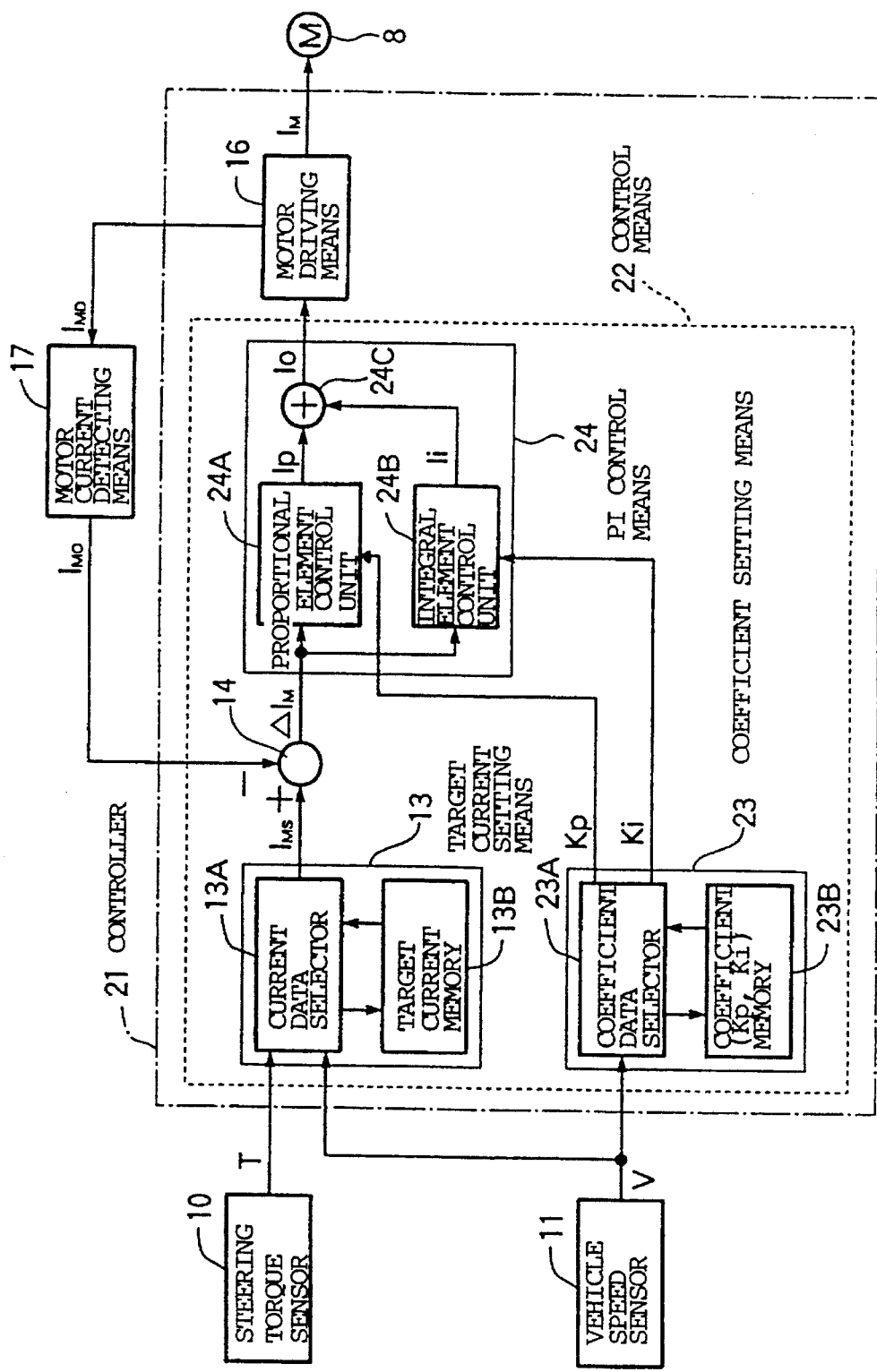
FIG. 1 is a block diagram of a controller and associated components of an electrically operated power steering apparatus according to the present invention.

As shown in FIG. 1, the electrically operated power steering apparatus according to the present invention also includes a controller 21 which comprises a control means 22 and a motor driving means 16. The control means 22 is supplied with a steering torque signal T and a vehicle speed signal V respectively from a steering torque sensor 10 and a vehicle speed sensor 11 which are identical to those shown in FIG. 3. The motor driving means 16 outputs a motor current $I_M$ to an electric motor 8 which is identical to that shown in FIG. 3.

The control means 22 has a target current setting means 13, a subtractor 14, a coefficient setting means 23, and a PI control means 24.

A motor current detecting means 17, connected between the motor driving means 16 and the subtractor 14, detects a current $I_{MD}$ corresponding to the motor current $I_M$ which energizes the electric motor 8, converts the detected current $I_{MD}$ into a motor current $I_{MO}$ suitable for control, and outputs the motor current $I_{MO}$ to the subtractor 14.

The target current setting means 13 comprises a current data selector 13A and a target current memory 13B. Based on the steering torque signal T and the vehicle speed signal V which are supplied respectively from the steering torque sensor 10 and the vehicle speed sensor 11, the current data selector 13A selects a target current $I_{MS}$ stored in the target current memory 13B, and outputs the selected target current $I_{MS}$ to the subtractor 14.

Figure 6:
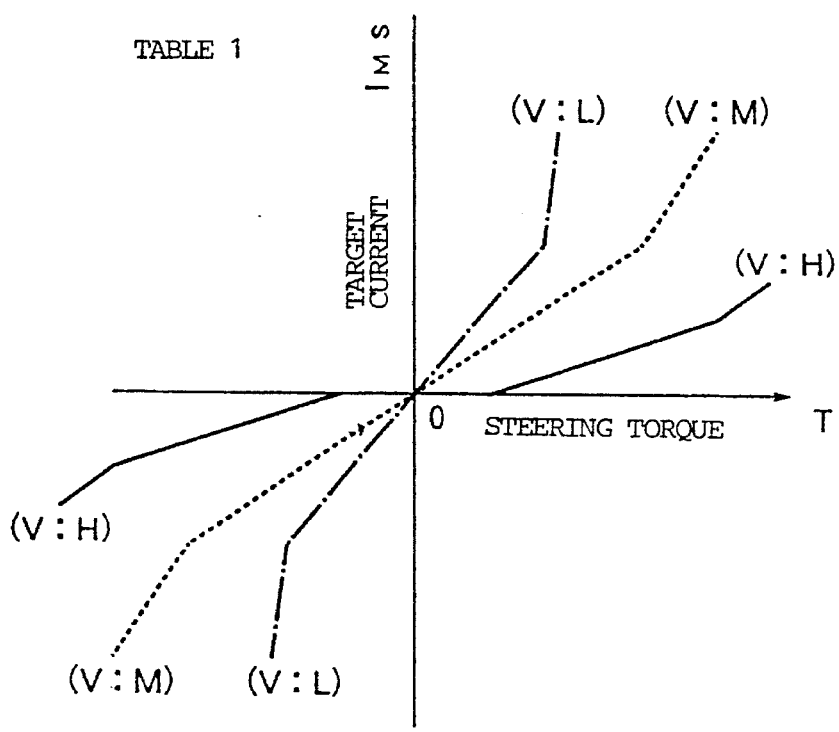
FIG. 6 is a diagram showing Table 1 of data representing steering torque signals T corresponding to target currents $I_{MS}$ with vehicle speed signals V used as a parameter.

The target current memory 13B comprises a ROM or the like and stores Table 1 (see FIG. 6) of data representing steering torque signals T corresponding to target currents $I_{MS}$ with vehicle speed signals V used as a parameter.

The coefficient setting means 23 comprises a coefficient data selector 23A and a coefficient memory 23B. Based on the vehicle speed signal V which is supplied from the vehicle speed sensor 11, the coefficient data selector 23A selects a proportional coefficient Kp and an integral coefficient Ki for the PI control means 24 which are stored in the coefficient memory 23B, and supplies the selected proportional and integral coefficients Kp, Ki to the PI control means 24 to vary the existing values of the proportional and integral coefficients Kp, Ki in the PI control means 24.

The coefficient memory 23B comprises a ROM or the like and stores Table 2 (see FIG. 7) of data representing proportional coefficients Kp and integral coefficients Ki which correspond to vehicle speed signals V.

Figure 7:
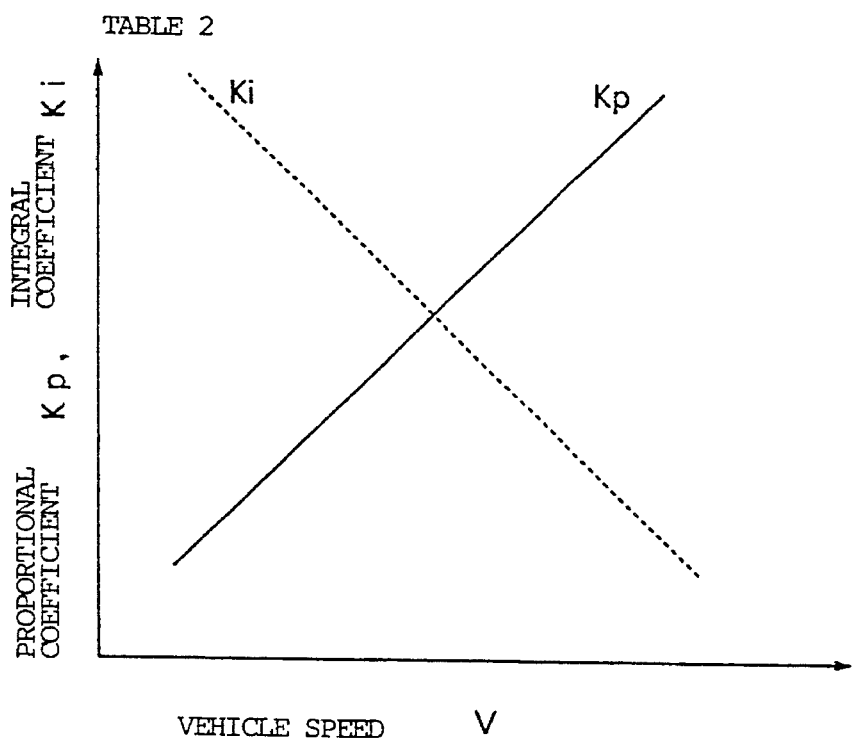
FIG. 7 is a diagram showing Table 1 of data representing proportional coefficients Kp and integral coefficients Ki which correspond to vehicle speed signals V.

As shown in FIG. 7, the proportional coefficient Kp increases as the vehicle speed signal V increases, and the integral coefficient Ki decreases as the vehicle speed signal V increases.

The PI control means 24 comprises a proportional element control unit 24A, an integral element control unit 24B, and an adder 24C. The proportional element control unit 24A and the integral element control unit 24B effect proportional and integral operations, respectively, on the difference or error $\Delta I_M$ between a target current $I_{MS}$ from the target current setting means 13 and the motor current $I_{MO}$, which is supplied from the subtractor 14, and output respective signals Ip, Ii to the adder 24C. The adder 24C adds the signals Ip, Ii into a current control signal $I_o$ which is then applied to the motor driving means 16.

The proportional element control unit 24A and the integral element control unit 24B have respective coefficient setting units (not shown) which establish values of the proportional and integral coefficients Kp, Ki supplied from the coefficient setting means 23.

The PI control means 24 has a transfer function $F_{PI}(j\omega)$ which is generally expressed according to the equation (4), given below, using the proportional and integral coefficients Kp, Ki.

$$\begin{aligned} F_{PI}(j\omega) &= Kp + Ki/j\omega \\ &= Kp(1 + Ki/j\omega Kp) \\ &= Kp(1 + 1/j\omega Ti) \end{aligned} \quad (4)$$

where Ti=Kp/Ki.

From the equation (4), a phase angle θ and a gain $20\log|G_{PI}(j\omega)|$ are calculated according to the following equations (5), (6), respectively:

$$\theta = \tan^{-1}(-1/\omega Ti), \quad (5)$$

$$20\log|G_{PI}(j\omega)| = 20\log(Kp) + 10\log\{1 + 1/(\omega Ti)^2\}. \quad (6)$$

Figure 2:
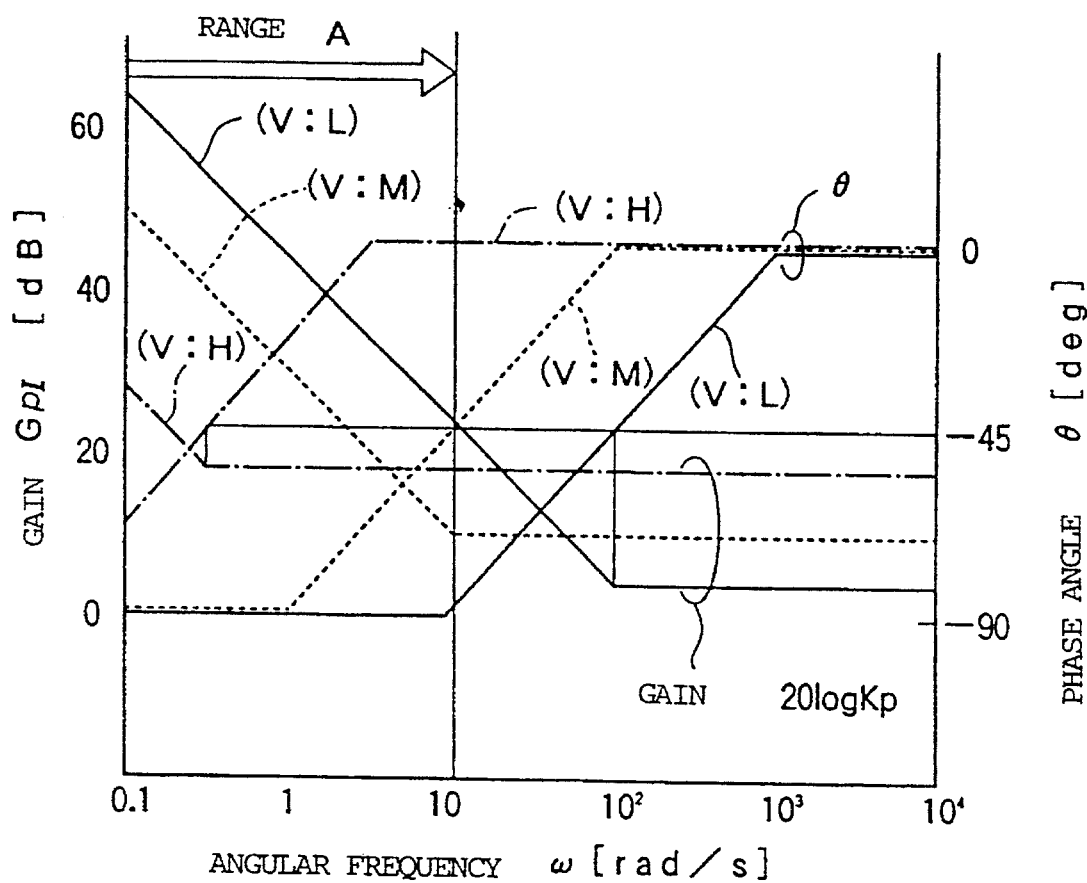
FIG. 2 is a Bode plot of a PI control means in the controller shown in FIG. 1, with vehicle speed signals V used as a parameter.

FIG. 2 is a Bode plot of the PI control means 24 in the controller 21 shown in FIG. 1, with vehicle speed signals V used as a parameter.

In FIG. 2, the phase angle θ is −45° at a break angular frequency $\omega=\omega_S=1/Ti$ (=Ki/Kp), and the gain $20\log|GpI(j\omega)|$ is $20\log(Kp)$ using an asymptote (actually, the gain is 3 dB higher than the gain of the asymptote).

Generally, the angular frequency ω representative of the steering rotational speed is low when the vehicle speed V is low and high when the vehicle speed V is high. However, the angular frequency ω lies between 1 and 10 [rad/s] indicated by a range A in FIG. 2.

As the angular frequency ω becomes higher than the break angular frequency $\omega_S$ ($\omega \geq \omega_S$), the phase θ approaches 0°, and the $20\log|G_{PI}(j\omega)|$ is maintained at a constant value of $20\log(Kp)$.

As the angular frequency ω becomes smaller than the break angular frequency $\omega_S$ ($\omega<\omega_S$), the phase θ approaches −90°, and the $20\log|G_{PI}(j\omega)|$ increases from the constant value of $20\log(Kp)$ along an asymptote represented by $20\log\omega$.

FIG. 2 also shows phase and gain characteristic curves (indicated by the solid lines), as reference characteristic curves, when the vehicle speed V is low (V:L) with the break angular frequency $\omega_S=10^2$ [rad/s], phase and gain characteristic curves (indicated by the broken lines) when the vehicle speed V is medium (V:M), and phase and gain characteristic curves (indicated by the dot-and-dash lines) when the vehicle speed V is high (V:H).

As the vehicle speed V increases from low to medium to high speeds, the proportional coefficient Kp supplied from the coefficient setting means 23 progressively increases, and the integral coefficient Ki supplied from the coefficient setting means 23 progressively decreases. Therefore, as the vehicle speed V increases, the break angular frequency $\omega_S$ decreases, e.g., it has a value of 10 [rad/s] when the vehicle speed V is medium and a value of 1 [rad/s] or less when the vehicle speed V is high, and the gain progressively decreases. However, the phase is greatly improved in the range A.

If the break angular frequency is set to $\omega_S=10^2$ [rad/s] when the vehicle speed V is low (V:L), then the gain decreases at medium and high vehicle speeds. Therefore, the target currents $I_{MS}$ in Table 1 shown in FIG. 6 which are stored in the target current memory 13B of the target current setting means 13 may be increased at medium and high vehicle speeds (V:M), (V:H) to compensate for gain reductions.

With the arrangement of the present invention, the control means 22 includes the coefficient setting means 23 which increases the proportional coefficient Kp and reduces the integral coefficient Ki for the PI control means 24 as the vehicle speed signal V increases. Therefore, the control means 22 can supply the motor driving means 16 with the current control signal $I_o$ that has a high gain at a low vehicle speed and suffers a small phase difference at a high vehicle speed.

Based on the supplied current control signal $I_o$, the motor driving means 16 supplies the motor current $I_M$ to energize the electric motor 8 such that it applies a large assistive steering force to the steering mechanism when the vehicle speed is low and also applies a quickly responsive assistive steering force to the steering mechanism when the vehicle speed is high.

Consequently, the electrically operated power steering apparatus allows the driver of the motor vehicle to have an appropriate steering feel while the vehicle is running at either a low speed or a high speed.

While the control means 22 has been shown as having the PI control means 24, the principles of the present invention are also applicable to a control means having a PID control means. If the PID control means is employed, then its derivative element may be varied depending on the vehicle speed for improved steering performance.

Although there has been described what is at present considered to be the preferred embodiment of the invention, it will be understood that the invention may be embodied in other specific forms without departing from the essential characteristics thereof. The present embodiment is therefore to be considered in all respects as illustrative, and not restrictive. The scope of the invention is indicated by the appended claims rather than by the foregoing description.

What is claimed is:

1. An electrically operated power steering apparatus comprising:

a steering mechanism for steering a motor vehicle;

a steering torque sensor for detecting a steering torque produced by said steering mechanism;

a vehicle speed sensor for detecting a vehicle speed of the motor vehicle;

an electric motor for applying an assistive steering force to said steering mechanism;

a motor current detecting means for detecting a motor current supplied to said electric motor;

target current setting means for determining a target current to be supplied to energize said electric motor based on a steering torque signal representing the steering torque detected by said steering torque sensor; and control means for controlling said electric motor;

said control means comprising:

proportional plus integral control means having a proportional element and an integral element for controlling said electric motor based on a difference between the target current determined by said target current setting means and the motor current detected by said motor current detecting means; and coefficient setting means for varying at least one of coefficients of said proportional element and said integral element based on a vehicle speed signal representing the vehicle speed detected by said vehicle speed sensor.

2. An electrically operated power steering apparatus according to claim 1, wherein said coefficient setting means comprises means for increasing the coefficient of said proportional element when said vehicle speed signal increases.

3. An electrically operated power steering apparatus according to claim 1, wherein said coefficient setting means comprises means for reducing the coefficient of said integral element when the vehicle speed signal increases.

4. An electrically operated power steering apparatus according to claim 1, wherein said coefficient setting means comprises:

a coefficient memory for storing coefficients of said proportional element and said integral element in relation to vehicle speeds; and a coefficient selector for selecting coefficients of said proportional element and said integral element from said coefficient memory depending on said vehicle speed signal.

* * * * *